(12) United States Patent
Meador et al.

(10) Patent No.: US 11,787,344 B2
(45) Date of Patent: Oct. 17, 2023

(54) OPEN INTERIOR DELIVERY CONTAINER

(71) Applicant: GM Cruise Holdings LLC, San Francisco, CA (US)

(72) Inventors: Timothy Jon Meador, Fairfield, CA (US); Alexis DeStasio, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 42 days.

(21) Appl. No.: 17/533,612

(22) Filed: Nov. 23, 2021

(65) Prior Publication Data

US 2023/0101348 A1   Mar. 30, 2023

Related U.S. Application Data

(60) Provisional application No. 63/250,616, filed on Sep. 30, 2021.

(51) Int. Cl.
*B60R 7/04* (2006.01)

(52) U.S. Cl.
CPC .................................. *B60R 7/043* (2013.01)

(58) Field of Classification Search
CPC ................................. B60R 7/04; B60R 7/043
USPC ....................... 224/275, 542; 296/37.15, 24.4
See application file for complete search history.

(56) References Cited

U.S. PATENT DOCUMENTS

| | | | | |
|---|---|---|---|---|
| 2,629,644 A * | 2/1953 | Heys | ...................... | A01K 97/06 312/304 |
| 2,744,667 A * | 5/1956 | Maloney | ................. | B60R 7/043 224/559 |
| 2,812,992 A * | 11/1957 | Lysen | ..................... | B60R 9/055 312/351 |
| 3,092,428 A * | 6/1963 | Kerschner | ................ | B25H 3/02 312/289 |
| 3,304,143 A * | 2/1967 | Connell | ................. | B60N 3/103 312/231 |
| 3,873,010 A * | 3/1975 | Patterson | ................ | B60R 7/043 220/23.88 |
| 4,146,159 A * | 3/1979 | Hemmen | ............... | B60N 3/002 224/275 |
| D299,186 S * | 1/1989 | Sills | ............................ | D12/425 |
| 4,917,430 A * | 4/1990 | Lawrence | ................ | B60R 9/02 224/281 |
| 4,936,624 A * | 6/1990 | West | ...................... | B60R 11/06 224/544 |

(Continued)

FOREIGN PATENT DOCUMENTS

| | | | | |
|---|---|---|---|---|
| CA | 2845013 C | * | 10/2019 | ............. B60R 7/043 |
| DE | 19947177 B4 | * | 5/2004 | ............. B60R 11/00 |

(Continued)

*Primary Examiner* — Justin M Larson
(74) *Attorney, Agent, or Firm* — Akona IP

(57) ABSTRACT

A delivery container is designed to fit into the rear passenger compartment of a vehicle, such as an autonomous vehicle (AV) that makes deliveries without a human driver. The delivery container includes a base, two sides, and a top. The sides are angled and the top is smaller than the base, which creates a large opening that is easy for a user to access and can adequately store large or bulky goods. The delivery container may be accessed from either side of the vehicle, and may include a drawer for moving items from one side of the vehicle to the other, so that items may be easily accessed from either side.

20 Claims, 13 Drawing Sheets

(56) References Cited

U.S. PATENT DOCUMENTS

| | | | | |
|---|---|---|---|---|
| 5,007,569 | A * | 4/1991 | Zarb | B60R 7/043 224/543 |
| 5,083,827 | A * | 1/1992 | Hollenbaugh, Sr. | B60R 13/01 296/37.16 |
| 5,419,470 | A | 5/1995 | Jackson | |
| 5,551,616 | A * | 9/1996 | Stitt | B60R 7/043 224/539 |
| 5,628,439 | A * | 5/1997 | O'Hara | B60R 7/043 224/563 |
| 5,683,132 | A * | 11/1997 | Danzo | B60R 7/02 296/37.16 |
| 5,964,492 | A * | 10/1999 | Lyon | B60R 9/00 224/404 |
| 6,142,574 | A * | 11/2000 | Alexander | B60N 2/2839 297/188.2 |
| 6,176,540 | B1 * | 1/2001 | Whittaker | B60J 7/1621 296/100.09 |
| 6,325,439 | B1 | 12/2001 | Crossman | |
| 6,386,412 | B1 * | 5/2002 | Konechne | B60R 7/04 D12/426 |
| 6,422,440 | B1 * | 7/2002 | Stone | B60R 7/043 D12/426 |
| 6,682,118 | B2 * | 1/2004 | Ryan | B60R 13/01 296/37.16 |
| 7,048,320 | B2 * | 5/2006 | Rubel | B60R 7/02 296/37.6 |
| D566,646 | S * | 4/2008 | Whittaker | D12/414.1 |
| 7,350,681 | B2 * | 4/2008 | Polburn | B60R 7/005 296/37.16 |
| 8,469,324 | B2 * | 6/2013 | Bostrom | F17C 13/084 297/188.04 |
| 8,662,367 | B2 * | 3/2014 | Panaro | B60R 11/00 224/542 |
| 8,720,991 | B2 * | 5/2014 | Macleod | B60R 7/043 297/188.2 |
| 8,757,458 | B2 * | 6/2014 | Nebel | B60R 9/00 224/42.32 |
| 8,807,620 | B1 * | 8/2014 | Eilers | B60R 21/06 296/24.4 |
| 9,173,374 | B2 * | 11/2015 | Hovsepian | A01K 1/0272 |
| D813,776 | S * | 3/2018 | Jaimes | D12/203 |
| D852,106 | S * | 6/2019 | Alesi | D12/203 |
| 10,336,261 | B2 * | 7/2019 | White | B60R 5/045 |
| 10,457,220 | B2 * | 10/2019 | Sanchez | B60N 3/048 |
| 11,425,886 | B2 * | 8/2022 | Weerappuli | A01K 1/0272 |
| 11,440,478 | B2 * | 9/2022 | Meador | B60R 7/043 |
| 11,498,488 | B2 * | 11/2022 | Setina | B60R 21/026 |
| 2002/0140246 | A1 * | 10/2002 | Worrell | B60N 2/26 296/37.8 |
| 2003/0057747 | A1 * | 3/2003 | Johnston | B60N 3/004 297/188.06 |
| 2004/0251704 | A1 * | 12/2004 | Rubel | B60R 7/02 296/37.6 |
| 2008/0067828 | A1 * | 3/2008 | Sturt | B60N 3/12 296/37.8 |
| 2012/0006871 | A1 * | 1/2012 | Strohecker | B60N 3/002 224/275 |
| 2014/0054920 | A1 | 2/2014 | Jeffries et al. | |
| 2019/0275949 | A1 * | 9/2019 | Kubota | B60R 7/043 |
| 2019/0352087 | A1 * | 11/2019 | Williams | B60R 7/043 |
| 2021/0197727 | A1 | 7/2021 | Meador et al. | |
| 2022/0348145 | A1 * | 11/2022 | Westfall | B60R 7/043 |

FOREIGN PATENT DOCUMENTS

| | | | | |
|---|---|---|---|---|
| DE | 102006023948 A1 * | 11/2007 | | B60R 7/02 |
| FR | 2663275 A1 * | 6/1990 | | |
| KR | 20120016887 A * | 2/2012 | | |
| WO | WO-03026916 A2 * | 4/2003 | | B60N 2/44 |
| WO | WO-2008017854 A1 * | 2/2008 | | B60R 7/043 |

* cited by examiner

OPEN INTERIOR DELIVERY CONTAINER

CROSS REFERENCE TO RELATED APPLICATION

This application claims the benefit of and priority to U.S. Provisional Application No. 63/250,616, filed Sep. 30, 2021, the disclosure of which is hereby incorporated by reference herein in its entirety for all purposes.

TECHNICAL FIELD OF THE DISCLOSURE

The present disclosure relates generally to delivery vehicles and, more specifically, to a delivery container for storing delivery loads within a vehicle.

BACKGROUND

In a conventional delivery context, a delivery driver drives a vehicle with items for delivery to recipients, and the driver removes the items for delivery and hand-delivers the items to their recipients. For example, a grocery delivery service may employ people to shop for a customer's groceries, load the groceries into a car, drive the groceries to a delivery address, and deliver the groceries from the car to the customer's doorstep.

Autonomous vehicles (AVs) can be used to deliver various items, such as groceries, to recipients. However, when an AV is used for delivery, there is nobody to assist the recipient with finding the recipient's items. Existing AVs for grocery delivery have built-in compartments that can store different loads for different customers. However, such AVs are specifically designed for grocery delivery, and the AVs cannot be repurposed for other applications, such as passenger transportation.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
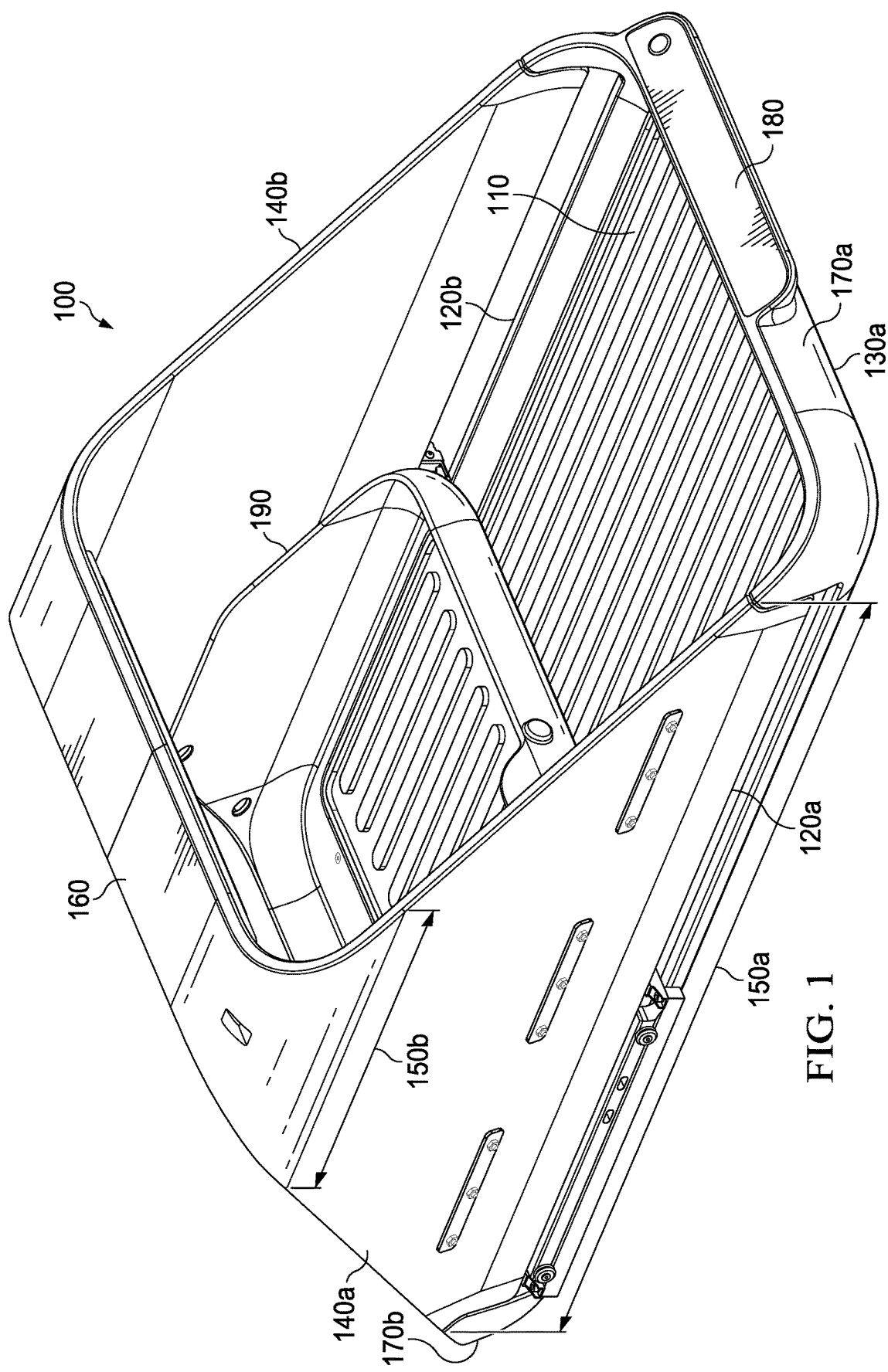
FIG. 1 is a front perspective view of a delivery container, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Several factors are considered when designing a delivery container suitable for use in the back passenger compartment of a vehicle, and in particular, in the back passenger compartment of an AV used for delivery. When the AV arrives at a delivery location, a recipient retrieves their items without assistance. The recipient should be able to easily see and identify their delivery items, and the recipient should be able to retrieve the items without difficulty, e.g., without excessive reaching or straining. In addition, the delivery container should adequately protect the delivery items, e.g., keeping items secure in the delivery container during transport to the recipient. For a grocery recipient, the delivery container should be large enough to transport a full load of groceries, and enable the storage of bulky or unusually shaped items, such as paper towels, toilet paper, large boxes, etc.

Design considerations from the point of view of the delivery operator include ease of loading the items and ease of cleaning the delivery container. For example, the delivery operator prefers a delivery container that can be easily cleaned between delivery loads. In some cases, if the delivery operator may switch an AV between different types of assignments (e.g., the AV is sometimes used to delivery groceries, and at other times used to provide a ride service), it is useful for the delivery container to be easily installed and uninstalled. If the delivery service delivers loads that take up less than the full size of the container, in addition to providing an overall large capacity, it is useful for the delivery container to include a divider to divide the container into different sections for different loads.

As described herein and shown in the accompanying figures, a delivery container is sized and shaped to fit into the rear passenger compartment of a vehicle. In some embodiments, a structural frame attaches to various attachment points in the rear passenger compartment of the vehicle (e.g., the lower anchors and tethers for children (LATCH) anchor hardware in the vehicle; cushion grommets; and seatback strikers), and the delivery container attaches to the structural frame. The structural frame provides secure attachment and alignment of the delivery container to the AV and holds the delivery container securely in place during transport. In some embodiments, the configuration of the structural frame and the delivery container enable the delivery container (and the structural frame) to be easily removed and replaced with a back passenger seat, so that the AV can be reconfigured for passenger use.

The container is partially enclosed, which provides structure and security for delivery loads, while still providing good visibility of the items in the container and room for bulkier items. The top of the container can provide a structure for a ceiling-mounted divider to divide delivery loads and/or for container lighting to further improve visibility. Cameras or other sensors for item detection may also be mounted to the top of the container or elsewhere in the delivery container or in the AV. Furthermore, the top of the container provides a degree of shading from the sun, which can help with temperature control, especially in hot environments. Leaving the ends of the container partially opened at the top and sides allows for certain large or bulky items to stick out of the non-enclosed portions of the container.

Delivery vehicles often carry loads for multiple recipients simultaneously. For example, a vehicle used to delivery groceries receives multiple loads of groceries at a grocery store, and the vehicle drops off the loads of groceries to their respective recipients without returning to the grocery store between deliveries. When the vehicle is operated by a human driver, the driver typically ensures that each recipient receives the correct grocery load. However, when an AV is used to delivery groceries, there is no human operator to ensure that the grocery loads go to the correct recipients.

In some embodiments, to enable the delivery container to carry multiple loads for different recipients, a sliding mechanism within the container can move items from one side of the container (e.g., the left side of the rear passenger compartment) to another side of the container (e.g., the right side of the rear passenger compartment). As noted above, a divider can separate two compartments in the delivery container, so that it is apparent to the first recipient which items are theirs. If the delivery container contains two loads, after the first recipient retrieves their items, the divider is released, and the sliding mechanism can move the second load from one side of the delivery container to the other. This enables both recipients to retrieve their items from the same side of the vehicle (e.g., the right side). If the delivery container contains a single load, the sliding mechanism enables a recipient to retrieve all of the items from one side of the vehicle.

Embodiments of the present disclosure provide an in-vehicle delivery container configured to fit into a rear cabin of a vehicle, the delivery container including a base having a first edge, a second edge opposite the first edge, a third edge extending between the first edge and the second edge, and a fourth edge opposite the third edge and extending between the first edge and the second edge, the third edge proximate to a first door to the rear cabin, the fourth edge proximate to a second door to the rear cabin; a first side extending upward from the first edge, the first side having a first width at a lower portion of the first side and a second width at an upper portion of the first side, the second width less than the first width, the first side proximate to a back of the rear cabin; a second side extending upward from the second edge; and a top extending between the first side and the second side, the top having a smaller surface area than the base.

Further embodiments of the present disclosure provide a delivery container including a base having a first edge, a second edge opposite the first edge, a third edge extending between the first edge and the second edge, and a fourth edge opposite the third edge and extending between the first edge and the second edge, the first edge and second edge having greater length than the third edge and the fourth edge; a first side extending upward from the first edge, the first side having a first width at a lower portion of the first side and a second width at an upper portion of the first side, the second width less than the first width; a second side extending upward from the second edge; and a top extending between the first side and the second side, the top opposite the base.

Still other embodiments of the present disclosure provide a delivery container including a base having a first surface area, the base having a first edge, a second edge opposite the first edge, a third edge extending from the first edge and the second edge, and a fourth edge opposite the third edge and extending between the first edge and the second edge; a first side extending upward from the first edge; a second side extending upward from the second edge; and a top extending between the first side and the second side, the top having a smaller surface area than the base.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example Delivery Container

Figure 2:
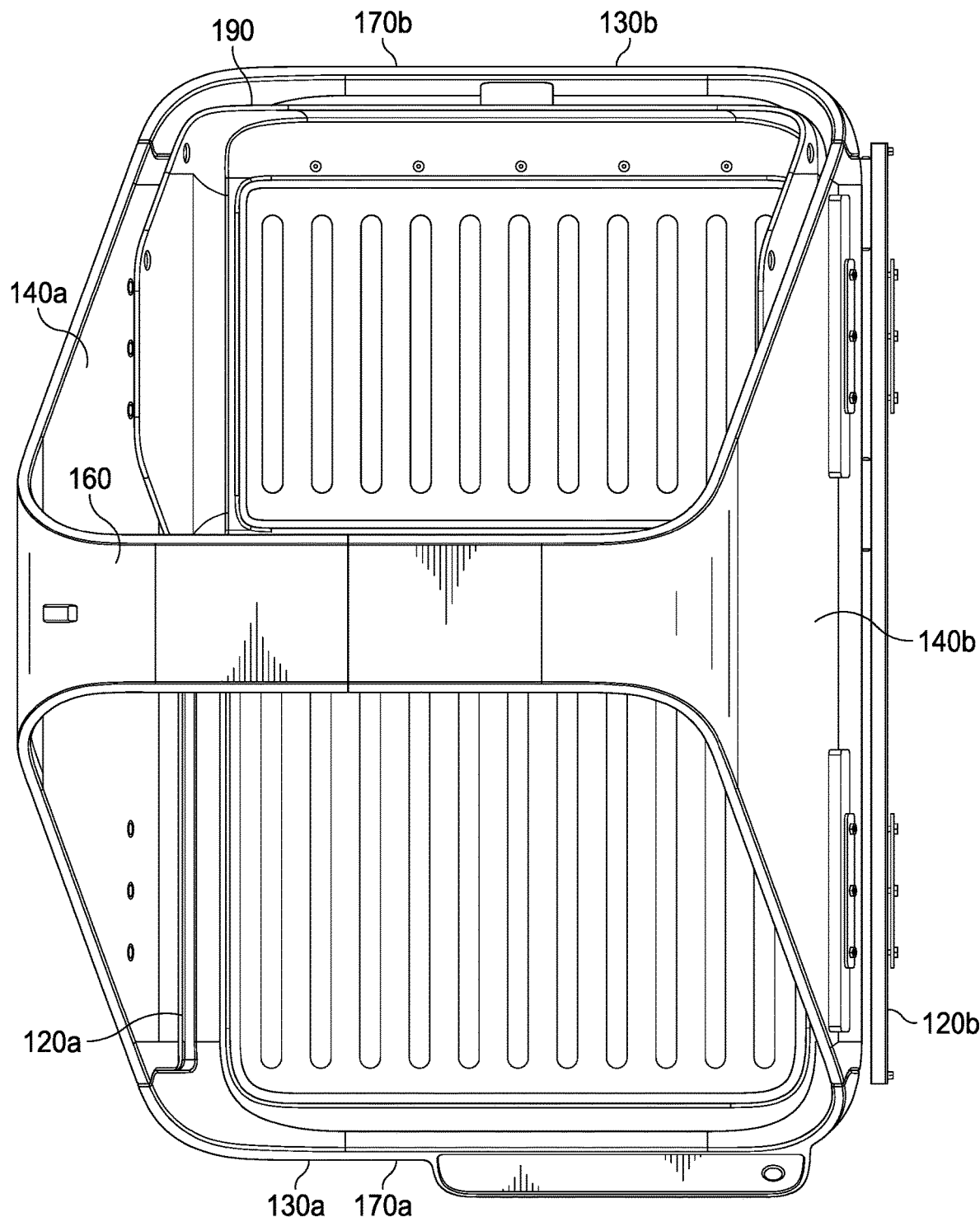
FIG. 2 is a top view of the delivery container, according to some embodiments of the present disclosure.

FIGS. 1 and 2 show a front perspective view and a top view of a delivery container 100, according to some embodiments of the present disclosure. The delivery container 100 includes a base 110 with two long edges 120 and two short edges 130, two sides 140 extending upward from the long edges 120, and a top 160 extending between the two sides 140. FIGS. 1 and 2 both illustrate a first long edge 120a and a second long edge 120b; the second long edge 120b is on the opposite side of the base 110 from the first long edge 120a. FIG. 1 illustrates a first short edge 130a, and FIG. 2 illustrates the first short edge 130a and a second short edge 130b, where the second short edge 130b is on the opposite side of the base 110 from the first short edge 130a. The short edges 130 extend between the long edges 120a and 120b, and the long edges 120 extend between the short edges 130a and 130b. The length of the long edges 120 is greater than the length of the short edges 130.

The sides 140 have a width that decreases moving from the base 110 towards the top 160. In this example, the sides 140 are roughly trapezoidal. Two widths 150a and 150b on the first side 140a are illustrated in FIG. 1, where the first width 150a, near the base 110 of the delivery container 100, is larger than the second width 150b, near the top 160 of the delivery container 100. The second side 140b may have the same or similar widths 150 at the corresponding heights along the second side 140b. In other embodiments, the sides 140 may have different shapes; e.g., the sides 140 may have one wider, rectangular portion near the base 110, and a narrower rectangular portion near the top 160, with a small transition region between these two portions. In some embodiments, the sides 140 may have a larger surface area than shown in FIGS. 1 and 2; this may reduce visibility into the delivery container but provide more structure and security for the items in the delivery container.

The top 160 is positioned opposite the base 110 and covers a portion of the delivery container 100. The top 160 has a smaller surface area than the base 110. In other embodiments, the top 160 may have a larger or smaller area than shown in FIGS. 1 and 2. In some embodiments, the delivery container 100 may not include a top 160, but instead, is open at the top.

Figure 8:
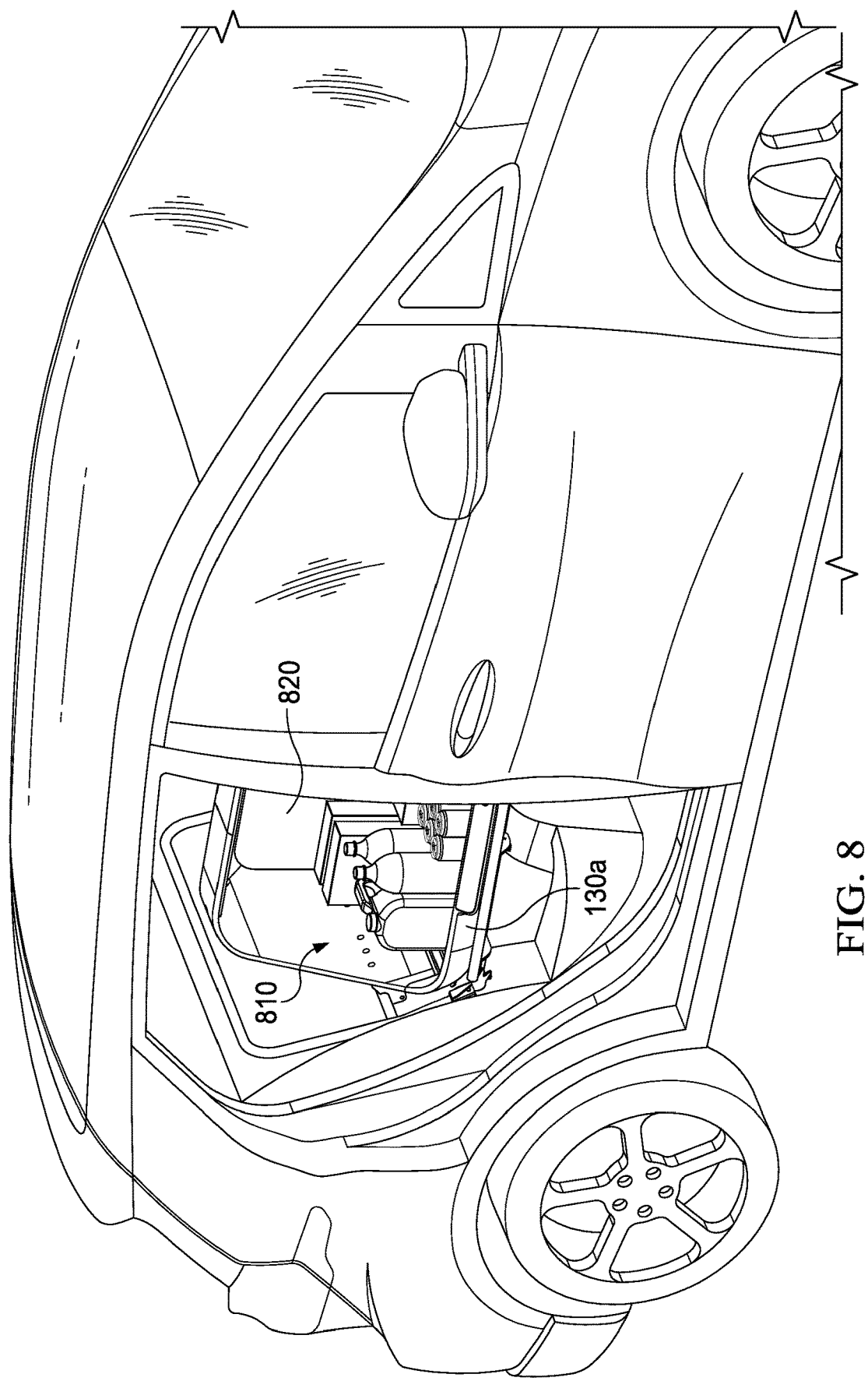
FIG. 8 is a view of an AV with a delivery container mounted in the back passenger cabin, according to some embodiments of the present disclosure.

The delivery container 100 is configured to fit in the rear passenger cabin of a vehicle, i.e., the part of the vehicle that typically includes back seats. The back seats may be removed to fit the delivery container 100, or the delivery container 100 may be installed over the back seats. When the delivery container 100 is mounted in a vehicle, the long edges 120 extend across the width of the back passenger cabin (e.g., from near the left back door to near the right back door), and the short edges 130 extend at least partially along the length of the back passenger cabin. More specifically, the first long edge 120a is located proximate to the back of the rear passenger cabin, and the second long edge 120b is located nearer to the front of the rear passenger cabin. The first short edge 130a is located proximate to the right door to the rear passenger cabin, and the second short edge 130b is located proximate to the left door to the rear passenger cabin. An example image of a delivery container in an AV is shown in FIG. 8, described below.

The delivery container 100 further includes a first lip 170a and a second lip 170b that extend upward from the base 110 from the first short edge 130a and the second short edge 130b, respectively. The lips 170 define the short ends of the delivery container 100 and prevent items in the delivery container 100 from slipping out of the delivery container 100 during transport. The lips 170 may extend upward from the base 110 for, e.g., 0.5 to 8 inches, and are curved outward from the short edges 130. As shown in FIGS. 1 and 2, the corners of the container are curved, e.g., FIG. 2 shows that the corners of the base 110 (e.g., between the edges 130 and 120) are rounded. Similarly, the joints between the long edges 120 and the sides 140 are rounded, as are the joints between the sides 140 and the top 160.

The first lip 170a includes a user interface (UI) panel 180. The UI panel 180 may include a screen providing information and/or instructions to a user. In some embodiments, the second lip 170b includes a second UI panel similar to the UI panel 180; the second UI panel may be used by a user accessing the delivery container 100 from the opposite side of the vehicle. The UI panel 180 may additionally or alternatively include one or more buttons, e.g., a button to change a position of a drawer 190 inside the delivery container 100, or a button to actuate a divider between two compartments of the delivery container. The drawer 190 may slide from one side of the delivery container 100 to the other side, enabling a recipient to access a load of items on the drawer 190 from either side of the delivery container 100. The drawer 190 and example dividers are described further in relation to FIGS. 7 and 9a-11b.

Example Delivery Container in Structural Frame

Figure 3:
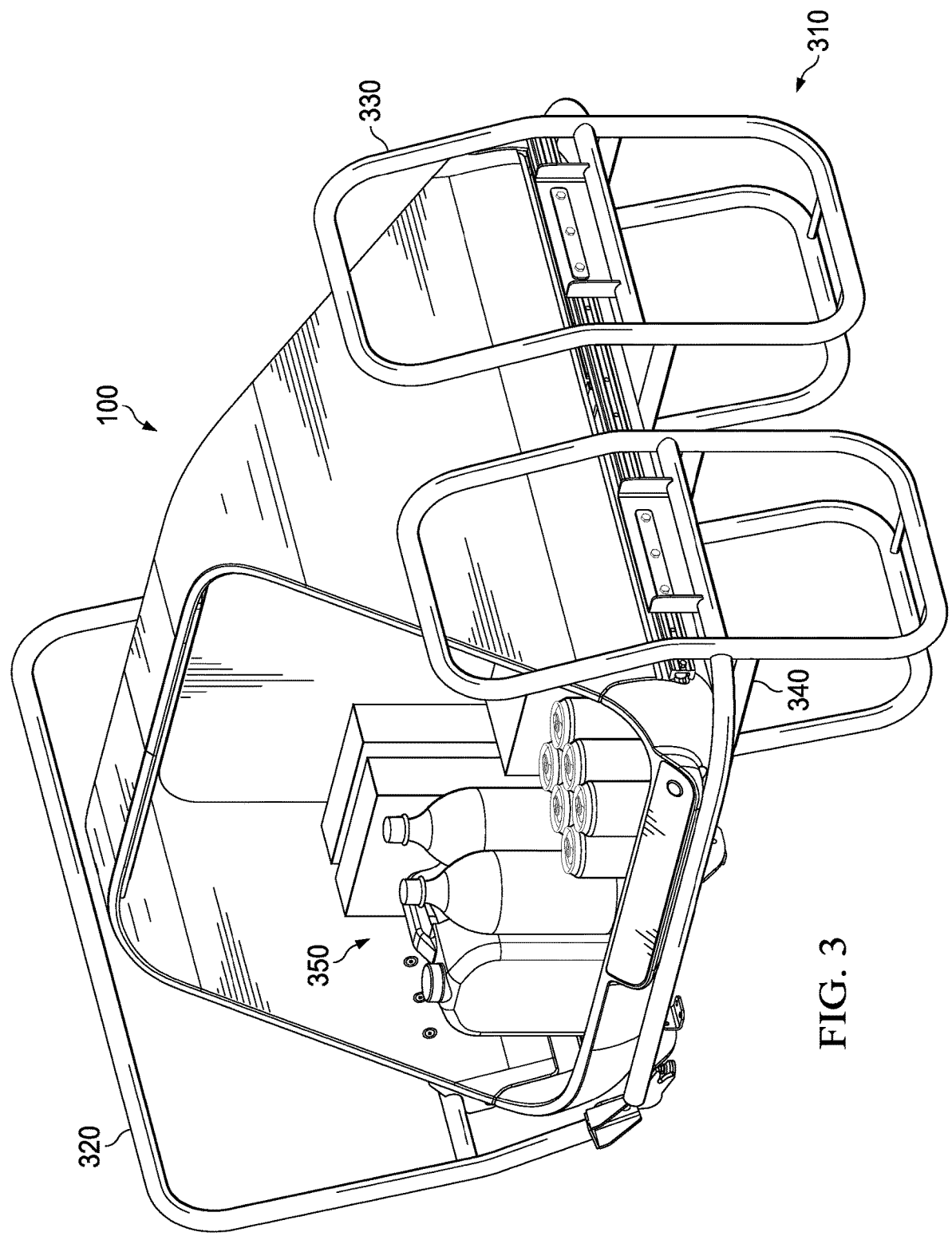
FIG. 3 is a perspective view of the delivery container attached to a structural frame, according to some embodiments of the present disclosure.

FIG. 3 is a perspective view of the delivery container 100 attached to a structural frame 310, according to some embodiments of the present disclosure. The delivery container 100 attaches to the structural frame 310 at various attachment points, such as the attachment points illustrated in FIG. 6. The structural frame 310 is configured to be securely mounted in the rear cabin of the vehicle. For example, the structural frame 310 can be coupled to various attachment points in the rear passenger compartment of the vehicle (e.g., LATCH anchor hardware in the vehicle's rear passenger compartment, cushion grommets, and/or seatback strikers), and the delivery container 100 attaches to the structural frame 310 to secure the delivery container 100 within the vehicle. FIGS. 4-7 show additional views of the delivery container 100 attached to the structural frame 310, and FIG. 8 shows the delivery container 100 and structural frame 310 in the rear passenger cabin of an AV.

Figure 6:
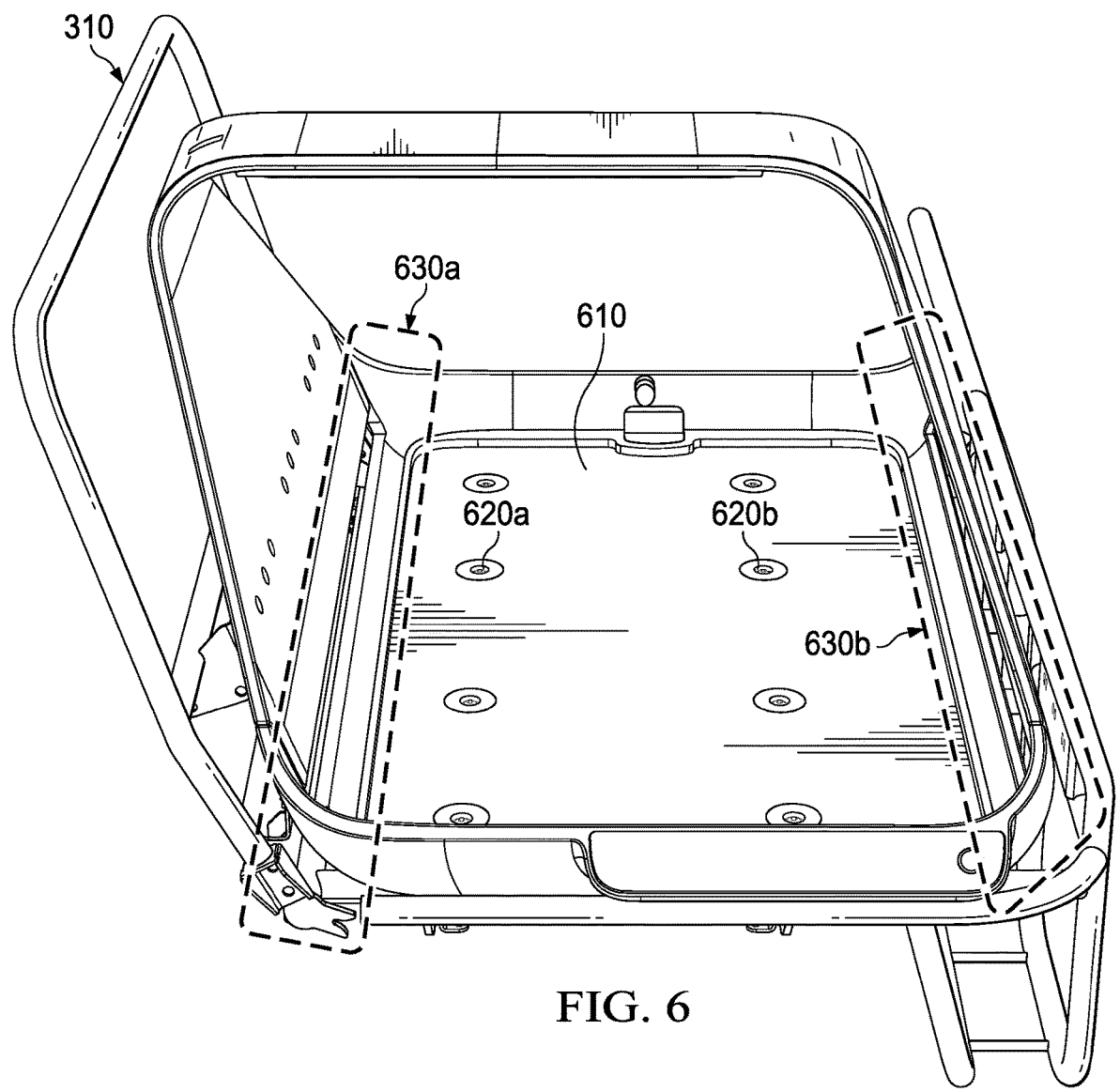
FIG. 6 is a front perspective view of the delivery container with the base tray removed, according to some embodiments of the present disclosure.

The structural frame 310 shown in FIG. 3 includes a back portion 320 that is proximate to the back of the rear passenger cabin, a front portion 330 that is nearer to the front passenger cabin, and a base 340 that extends underneath the delivery container 100. The delivery container 100 may attach to attachment points on the base 340, as shown in FIG. 6, and/or any other part of the structural frame 310. It should be understood that the structural frame 310 shown in the figures is merely an example, and the structural frame may be constructed differently than shown in figures. In this example, the delivery container 100 is loaded with groceries 350.

Figure 4:
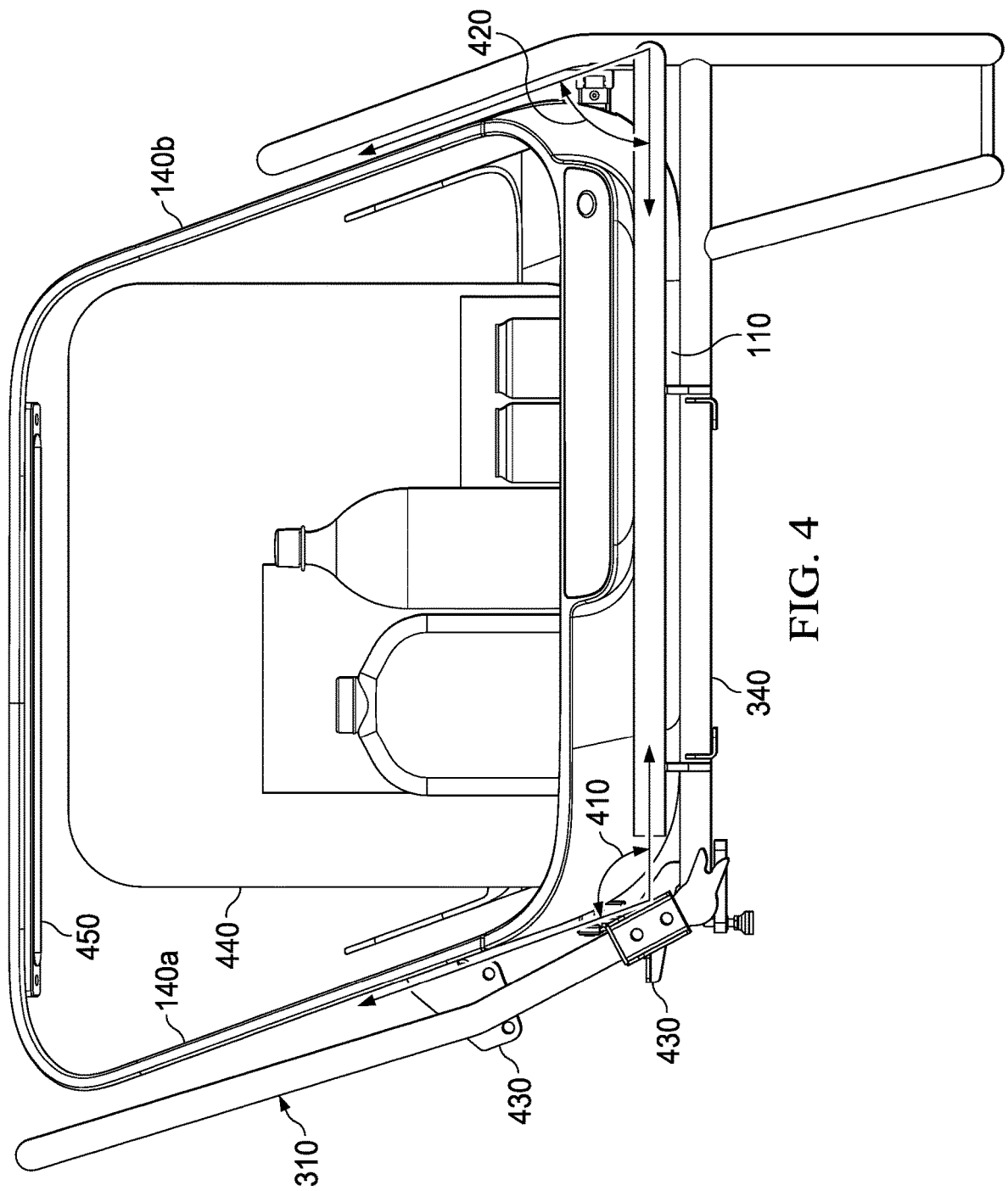
FIG. 4 is a front view of the delivery container in the structural frame, according to some embodiments of the present disclosure.

FIG. 4 is a front view of the delivery container in the structural frame, according to some embodiments of the present disclosure. FIG. 4 shows the delivery container 100 mounted in the structural frame 310. The front view of the delivery container 100 illustrates the angle 410 between the first side 140a and the base 110, and the angle 420 between the second side 140b and the base 110. In this example, the angle 410 is greater than 90°, while the angle 420 is less than 90°. These angles conform the shape of the delivery container 100 to the geometry of the rear passenger cabin of a vehicle, where the first side 140a is along the back of the rear passenger cabin (e.g., where the rear seat backs are typically located), and the second side 140b is near the front of the rear passenger cabin (e.g., near the backs of the front seats).

Rear passenger cabins generally have a seat well that the bases of the rear passenger seats fit into. This area may also be referred to as the rear seat passenger zone. If the passenger seats are removed, the structural frame 310 can fit into this seat well, and the shape of the seat well determines the position and shape of the lower portion of the delivery container 100. The seat well may have a base and an angled back wall, which is reflected in the shape of the delivery container 100, and in particular, in the angle 410. Above the seat well, the structural frame 310 and the delivery container 100 can extend further back, towards the rear of the vehicle. Furthermore, in some use cases, one or both of the vehicle's front passenger seats remain in the vehicle. The passenger seats typically angle backward, so the angle 420 maximizes volume of the delivery container 100 while leaving room for the front passenger seats to lean back.

FIG. 4 further shows several attachment points 430 on the structural frame 310 that may mount the structural frame 310 in the vehicle. The attachment points 430 may attach to, for example, LATCH anchor hardware, cushion grommets, and/or seatback strikers.

FIG. 4 also illustrates a divider 440 in the delivery container 100 that divides a first compartment of the delivery container 100 (i.e., the compartment shown in FIG. 4) and a second compartment located behind the divider 440. Example dividers are shown in FIGS. 9a-11b. A light strip 450 along the top of the delivery container 100 can illuminate items in the delivery container 100. The light strip 450 is shown in further detail in FIG. 13.

Figure 5:
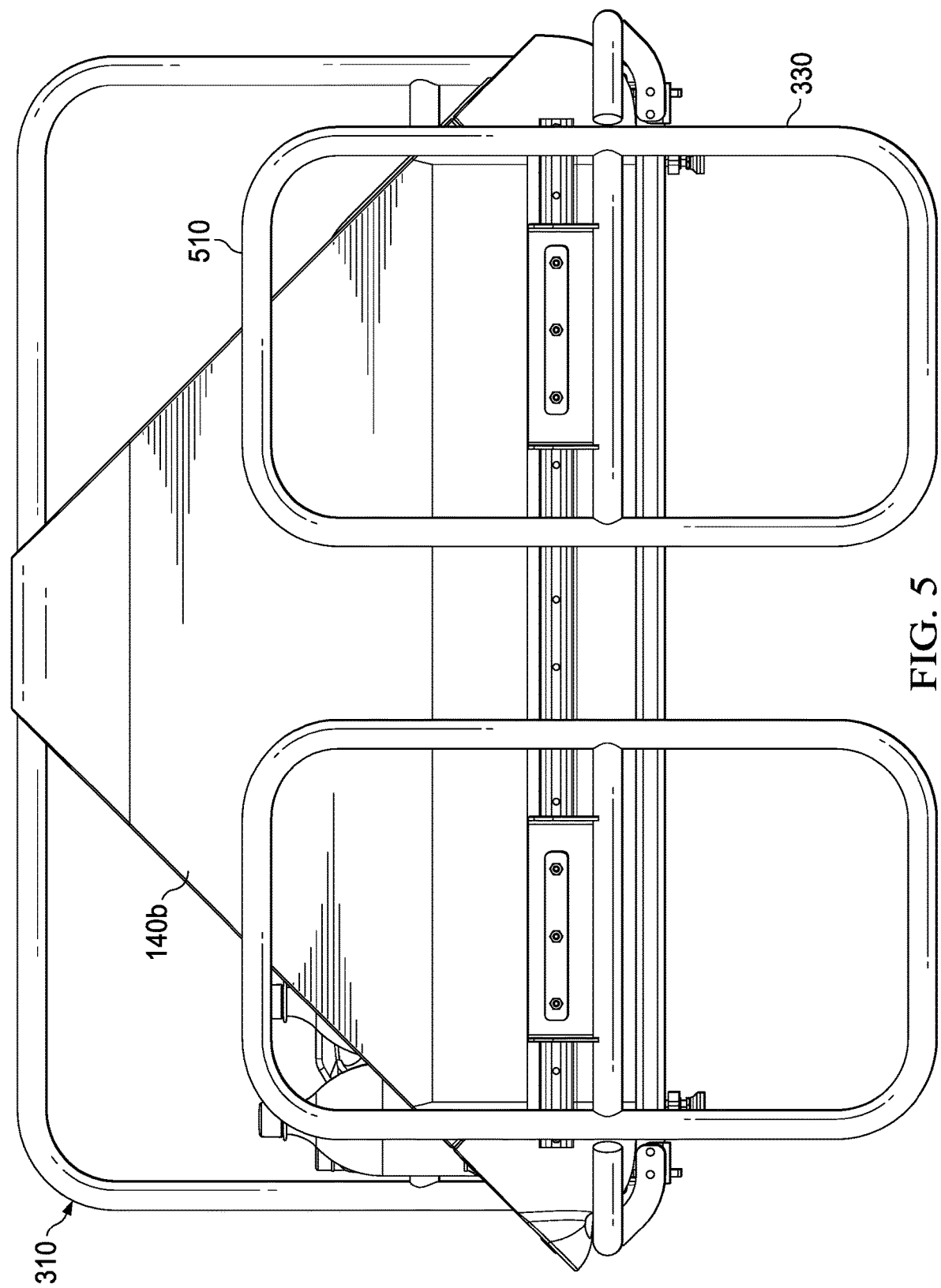
FIG. 5 is a side view of the delivery container in the structural frame, according to some embodiments of the present disclosure.

FIG. 5 is a side view of the delivery container in the structural frame, according to some embodiments of the present disclosure. FIG. 5 illustrates that the front portion 330 of the structural frame 310 includes guard rails 510 towards the front of the vehicle. The guard rails 510 extend above a portion of the second side 140b, which can help secure items in the rear passenger cabin. For example, of the vehicle crashes or brakes sharply, the guard rails 510 can prevent items from flying into the front passenger cabin.

FIG. 5 further shows that the delivery container 100 is symmetric from the side view. While in many cases, it is beneficial for a user to be able access the delivery container 100 from the right side of the vehicle (e.g., if the vehicle is parked along the right side of a roadway), in some use cases, it is useful for a user to be able to access the delivery container 100 from the left side of the vehicle. For example, if the user lives on the left side of a one-way street, the vehicle may pull over to the left side of the street, and the left rear door is safer for the user to access than the right rear door. By making the delivery container 100 symmetric, users may access the delivery container 100 from either side.

FIG. 6 is a front perspective view of the delivery container with a base tray removed, according to some embodiments of the present disclosure. In FIGS. 1 and 2, a base tray, or drip tray, was depicted over the base 110 of the delivery container 100. FIG. 6 shows an example illustration of a base 610 with no base tray over the base 610. The base 610 has attachment points 620 for attaching the base 610 to the structural frame 310. For example, the attachment points 620 may be bolt holes in which an operator can insert bolts that attach to corresponding bolt holes on the base of the structural frame 310.

While the delivery container is shown as being a single unit in FIG. 6, in some embodiments, the base 610 may be fabricated separately from the sides (e.g., the sides 140) and the top (e.g., the top 160), and the different parts of the delivery container may be assembled in the vehicle during installation of the delivery container. FIG. 6 illustrates two rounded joints 630a and 630b between the base 610 (in particular, the first long edge 120a and second long edge 120b) and the sides 140a and 140b. The rounded joints 630 may be formed by connecting the sides 140 to the base 610 along the long edges 120 of the base 610. In other embodiments, the joints 630, and/or the joints between the sides 140 and the top 160, have more or less curvature than shown in the figures.

Figure 7:
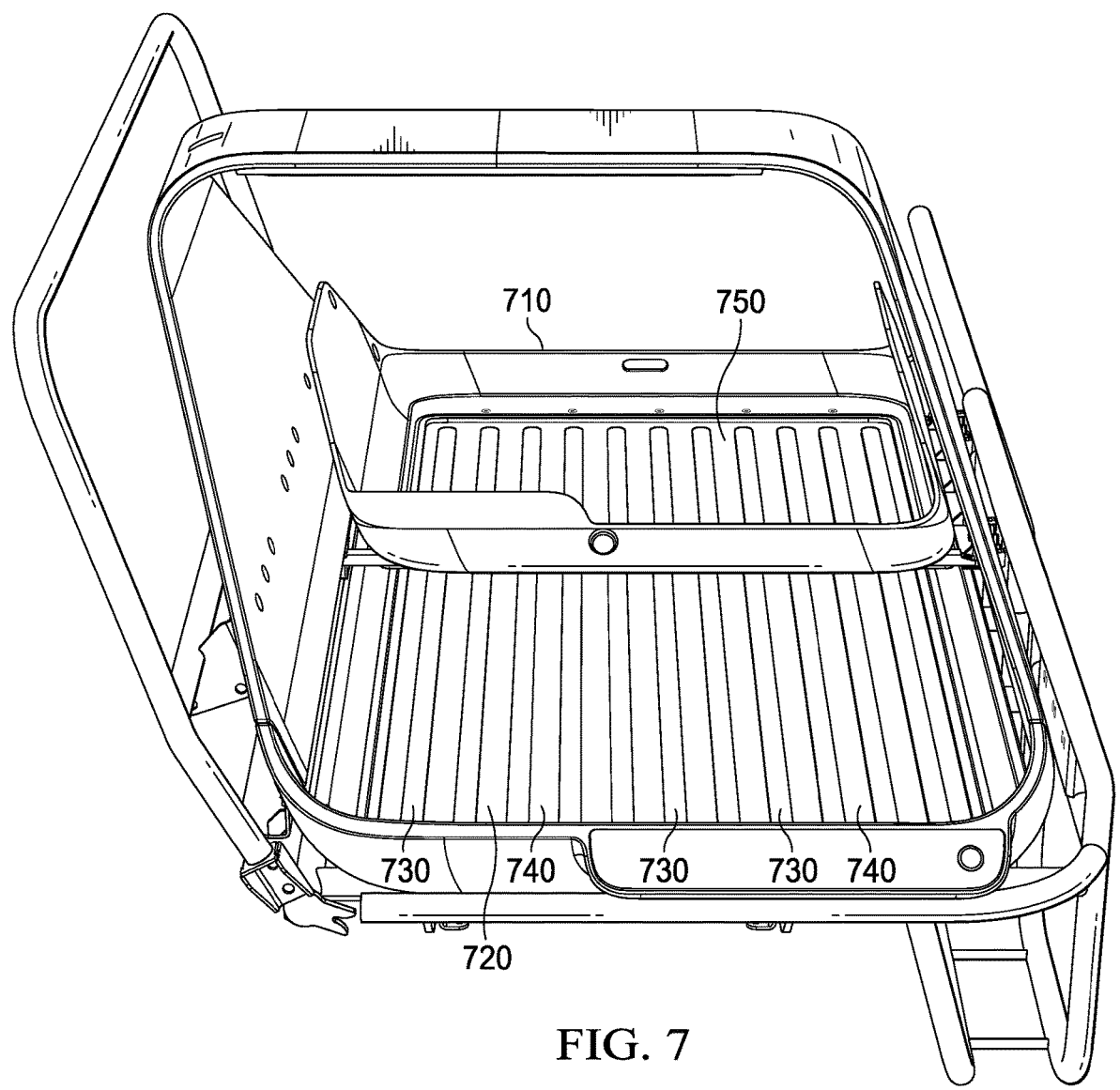
FIG. 7 is a front perspective view of the delivery container showing the base tray and drawer, according to some embodiments of the present disclosure.

FIG. 7 is a front perspective view of the delivery container showing the base tray and drawer, according to some embodiments of the present disclosure. After the base 610 is attached to the structural frame 310, as shown in FIG. 6, a base tray or drip tray 720 may be installed over the base 610. The drip tray 720 has alternating ridges 730 and grooves 740. If items (e.g., grocery items or other food delivery items) placed in the delivery container 100 have any liquid spillage or condensation, the liquids flow into the grooves 740, while the ridges 730 elevate the items above the grooves 740 and above any liquids in the grooves 740. The drip tray 720 may be easily cleaned (e.g., wiped with a soft cloth). The drip tray 720 may also be easy to remove, so that an operator can remove and clean the drip tray 720, or remove and replace the drip tray 720 if it becomes heavily stained or damaged. The ridges 730 may also prevent items from sliding during transport across the base of the delivery container.

FIG. 7 also shows a drawer 710 mounted in one portion of the delivery container 100. The drawer 710 is positioned in a back portion of the delivery container 100 (in the orientation of FIG. 7), and the drawer 710 can move along a track, e.g., to move from the back portion to the front portion of the delivery container 100. Thus, if items are placed on the drawer 710, they can be moved to either side of the delivery container 100 and accessed from either the right rear door or the left rear door. The drawer 710 further includes a drawer drip tray 750, which is similar to the base drip tray 720.

FIG. 8 is a view of an AV with a delivery container mounted in the rear passenger cabin, according to some embodiments of the present disclosure. FIG. 8 illustrates how the delivery container 100 fits into the rear passenger compartment of a vehicle and is mounted to the structural frame. In this view, a first compartment 810 that includes the first short edge 130a can be accessed from the open AV door, which is the right rear door of the AV. The delivery container has a divider 820 which separates the first compartment 810 from a second compartment located behind the divider 820 and proximate to the left rear door.

Example Delivery Container Dividers

As noted above, the delivery container 100 may have a divider to separate portions or compartments of the container. This enables a single delivery container to hold multiple loads for different recipients. Three example dividers are shown in FIGS. 9-11. The delivery container can further include a drawer or tray (referred to generally herein as a drawer) for sliding a delivery load from one side of the container to the other side.

Figure 9A:
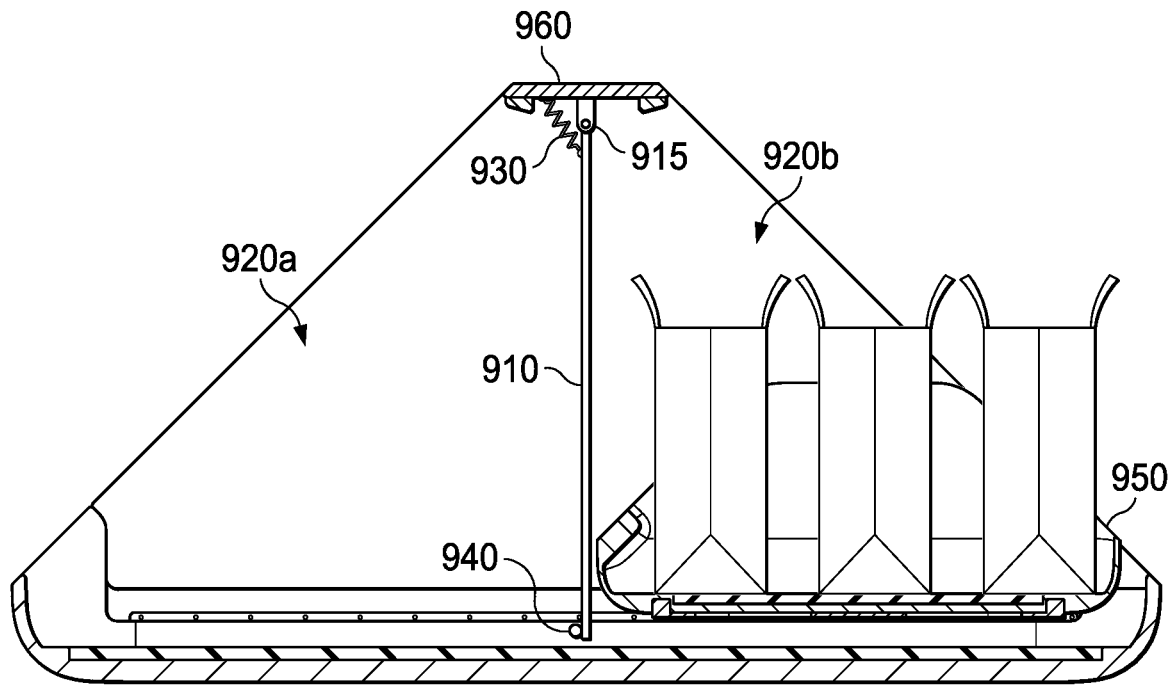
FIGS. 9a and 9b show side cutaway views of a hinged top-mounted divider in two positions, according to some embodiments of the present disclosure.
Figure 9B:
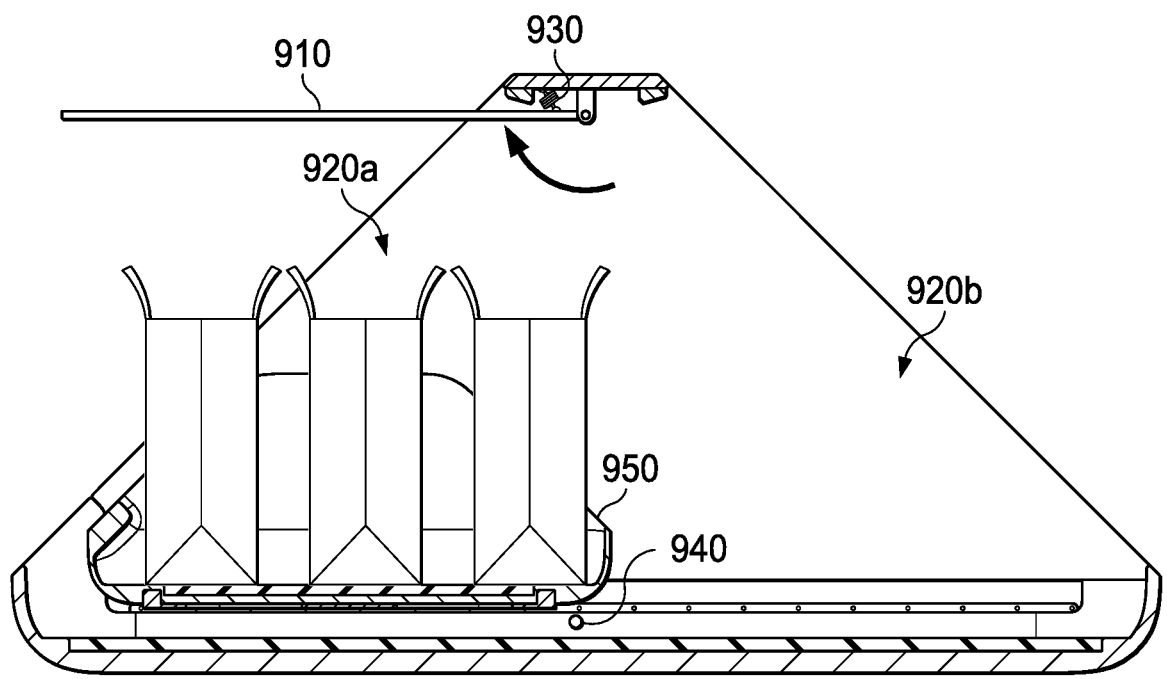

FIGS. 9a and 9b show side cutaway views of a hinged top-mounted divider 910 in two positions, according to some embodiments of the present disclosure. The divider 910 is attached to the top 960 of the delivery container, e.g., at a hinged joint 915 connecting the divider 910 to the top 960. The divider 910 may be made of plastic, metal, fabric supported by a metal wire around its edge, or another material. The divider 910 may be load bearing (e.g., so that items may lean against the divider 910) or non-load bearing. If the divider 910 is not load bearing, a person loading the items for delivery may be advised not to rest or lean delivery items against the divider 910, e.g., by instructions printed on the divider 910.

FIG. 9*a* shows the divider 910 in a first position, where the divider 910 separates a first compartment 920*a* from a second compartment 920*b*. The first compartment 920*a* is bounded by the divider 910, a portion of the base 110, a portion of each of the sides 140, and the first lip 170*a* (annotated in FIG. 1), including the first short edge 130*a*. The second compartment 920*b* is bounded by the divider 910, a portion of the base 110, a portion of each of the sides 140, and the second lip 170*b* (annotated in FIG. 1), including the second short edge 130*b*.

The divider 910 is spring-loaded, with a spring 930 coupling the divider 910 to the top 960 of the delivery container near the joint 915. While in the first position, the divider 910 is held vertically in place at or near the base of the container by a latch 940. The delivery container may include one latch 940 near the bottom of one of the sides 140 of the delivery container, or two latches, one on each of the sides 140 of the delivery container. The latch 940 or latches may be controlled by an electronic controller. In some cases, the latch 940 may be controlled by a user, e.g., in response to a user pressing a button on the UI panel 180. When the latch 940 is actuated (e.g., retracted to no longer exert force on the divider), the spring 930 causes the divider 910 to swing upwards to a second position, as shown in FIG. 9*b*. When the divider 910 is in the second position, a delivery load on the drawer 950 in the second compartment 920*b* can move to the other side of the divider 910 and into the first compartment 920*a*, as illustrated in FIG. 9*b*. In other embodiments, the delivery load may be moved from the second compartment 920*b* to the first compartment 920*a* by another mechanism, e.g., a conveyor belt.

Figure 10A:
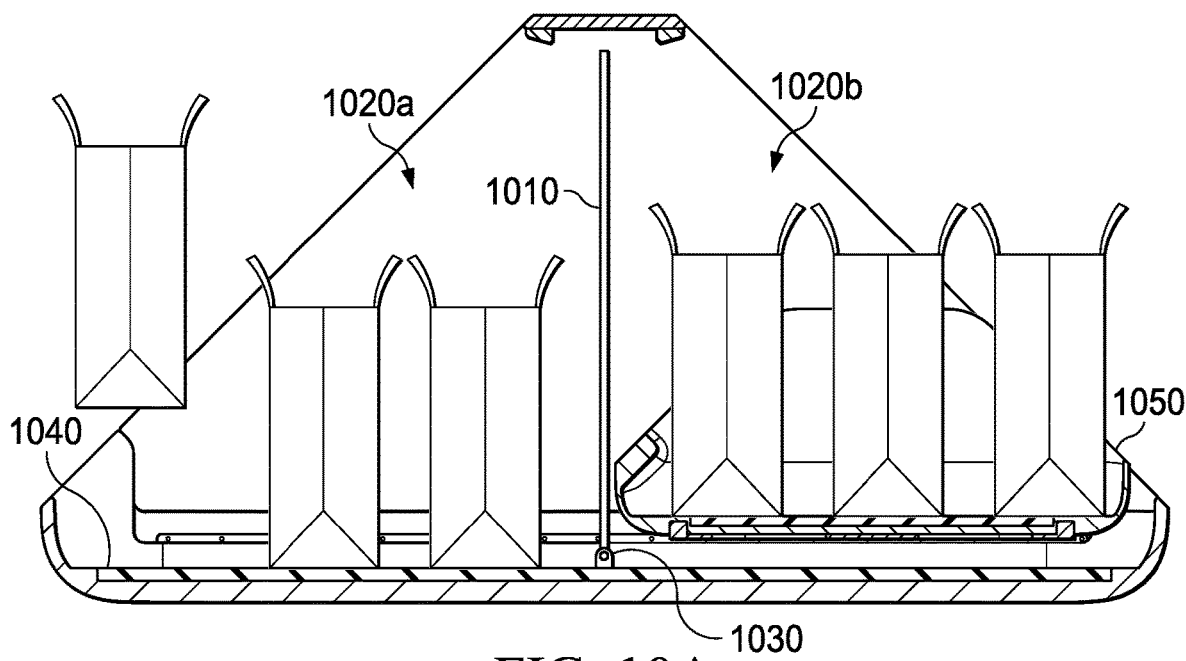
FIGS. 10a and 10b show side cutaway views of a hinged bottom-mounted divider in two positions, according to some embodiments of the present disclosure.
Figure 10B:
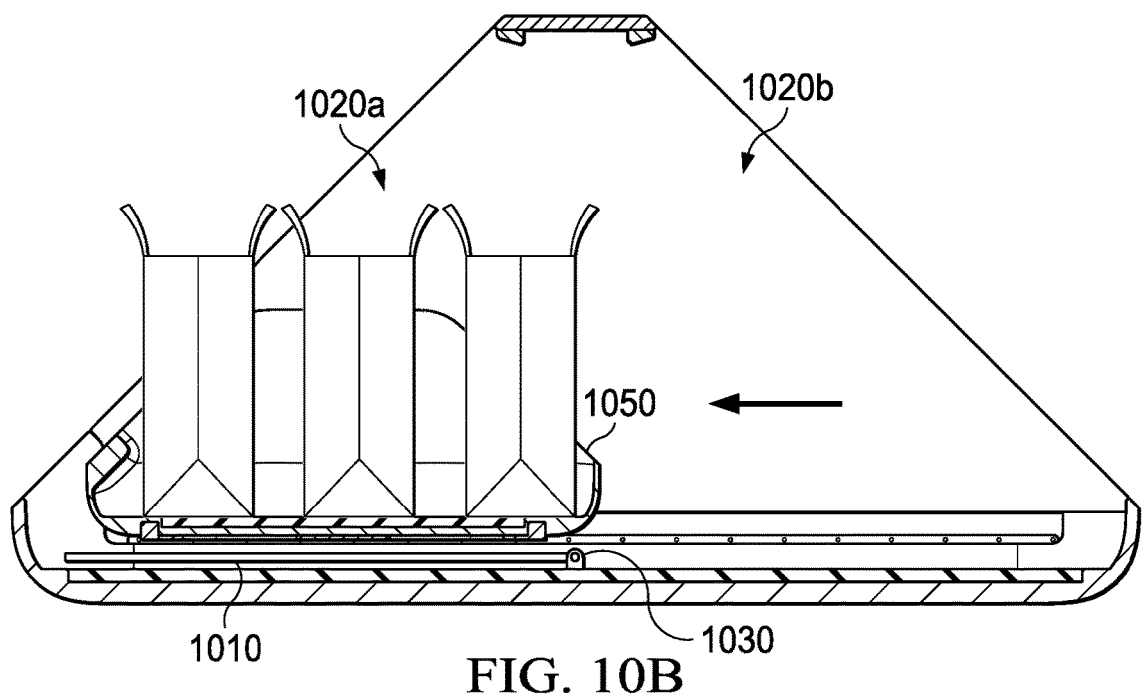

FIGS. 10*a* and 10*b* show side cutaway views of a hinged bottom-mounted divider 1010 in two positions, according to some embodiments of the present disclosure. In this example, the divider 1010 is attached to the base of the delivery container at a hinge 1030. In the first position shown in FIG. 10*a*, the divider 1010 separates a first compartment 1020*a* from a second compartment 1020*b*; the first and second compartments 1020 are similar to the first and second compartments 920 described with respect to FIG. 9*a*.

The divider 1010 may be made of plastic, metal, fabric supported by a metal wire around its edge, or another material. The divider 1010 may be load bearing (e.g., so that items may lean against the divider 1010) or non-load bearing. In some embodiments, the delivery container includes a latch or other mechanism along the top of the container or near the top of one or both of the sides 140 to hold the divider 1010 in its upright position. The hinge 1030 enables the divider 1010 to swing downward so that it lays flat over the base of the delivery container, as illustrated in FIG. 10*b*. The hinge 1030 may be actuated by an electronic controller. In some cases, the hinge 1030 may be controlled by a user, e.g., in response to a user pressing a button on the UI panel 180, or the user pulling down the divider 1010. When the divider 1010 is in the second position, a delivery load on the drawer 1050 in the second compartment 1020*b* can move into the first compartment 1020*a* over top of the divider 1010, as illustrated in FIG. 10*b*.

Figure 11A:
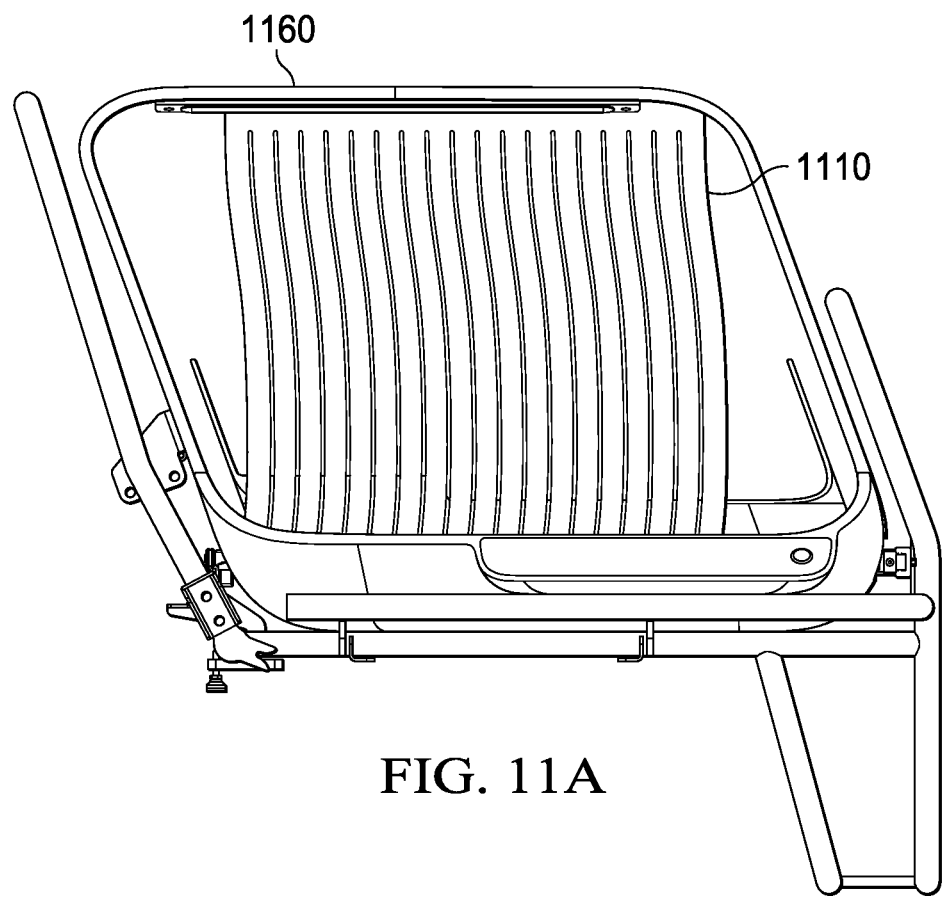
FIGS. 11a and 11b show front and side cutaway views of a curtain divider, according to some embodiments of the present disclosure.
Figure 11B:
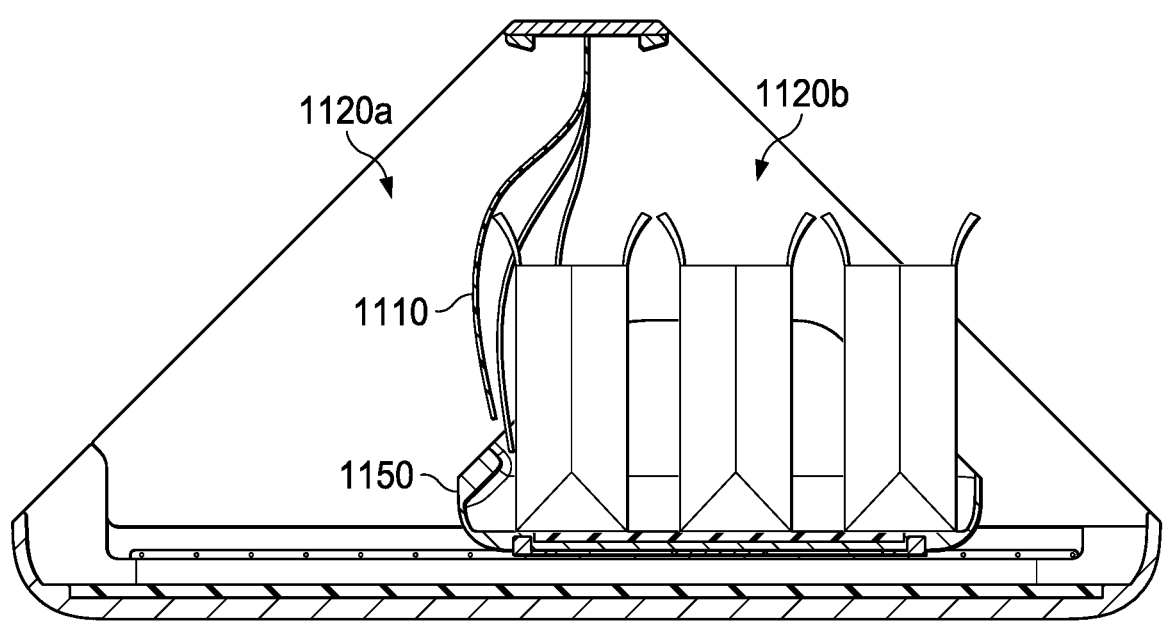

FIGS. 11*a* and 11*b* show front and side cutaway views of a curtain divider 1110, according to some embodiments of the present disclosure. In this example, the divider 1110 is flexible curtain, such as a piece of fabric or flexible plastic, that hangs down from the top 1160 of the delivery container. Rather than moving the divider 1110 out of the way prior to moving the delivery items from one side of the delivery container to the other, as shown in FIGS. 9 and 10, the flexible curtain passively allows delivery items to pass from one side of the divider 1110 to the other. For example, as shown in FIG. 11*b*, a delivery load moving from the second compartment 1120*b* to the first compartment 1120*a* on a drawer 1150 can push the curtain divider 1110 up and out of the way, as illustrated by the multiple positions of the divider 1110 in FIG. 11*b*. In other embodiments, the delivery load may be moved from the second compartment 1120*b* to the first compartment 1120*a* by another mechanism, e.g., a conveyor belt. The divider 1110 is not load bearing. The divider 1110 is not controlled by an actuator, which may make the divider 1110 simpler and less expensive than the dividers 910 or 1010.

While each of the divider embodiments shown in FIGS. 9-11 include a single divider 910, 1010, or 1110 for separating the delivery container into two compartments, it should be understood that in other embodiments, two or more dividers may be included to separate the delivery container into three or more compartments. Furthermore, in some embodiments, the divider or dividers do not divide the container into equally sized compartments, but may instead create compartments of different sizes. In some embodiments, a divider may be moveable to create differently sized compartments, e.g., the divider 1110 shown in FIG. 11 may be attached to a set of rails along the top of the container, and the divider 1110 may be moved along the rail to change the sizes of the compartments.

Example Delivery Container Cover

Figure 12:
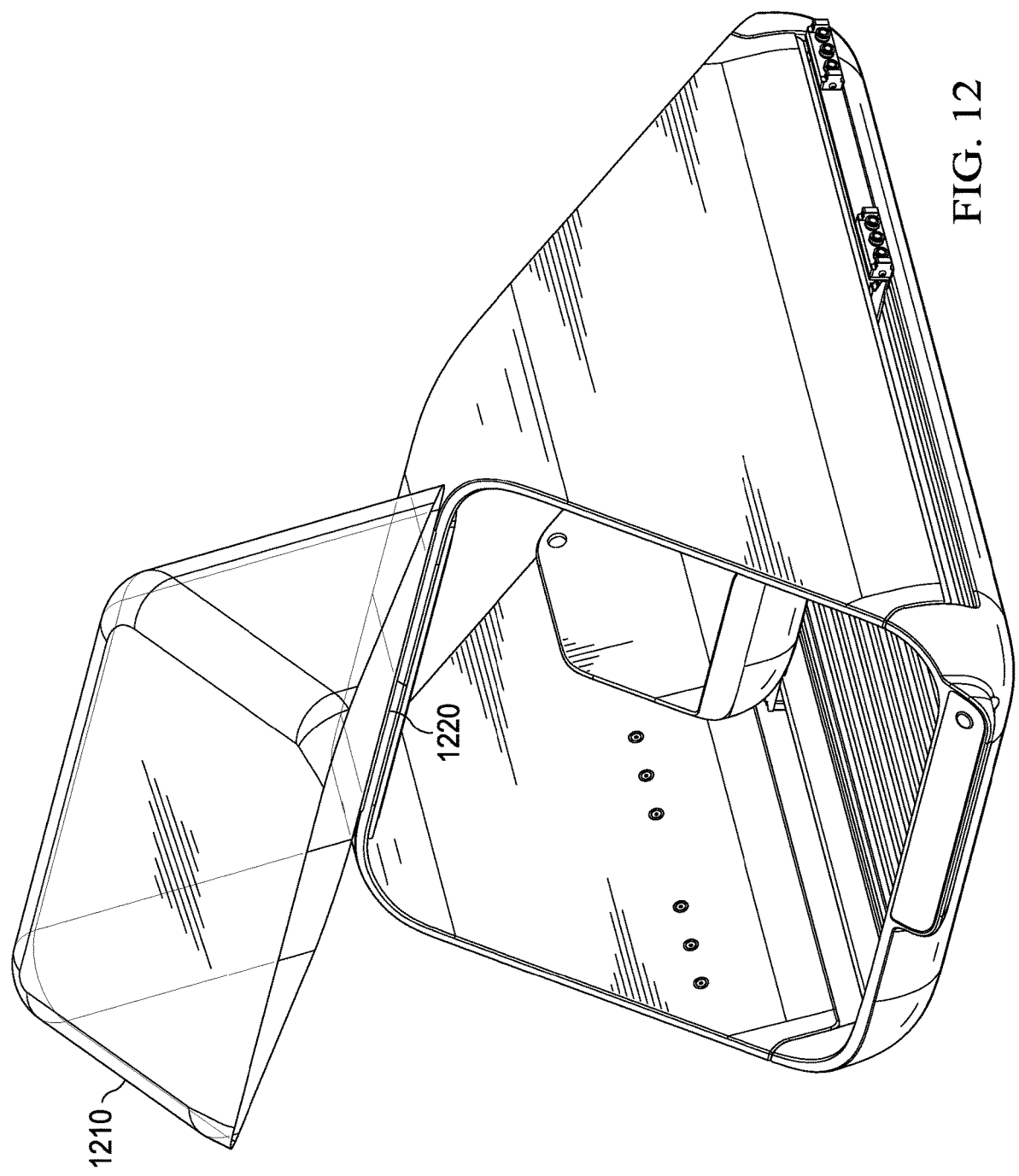
FIG. 12 shows a perspective view of a delivery container with a cover, according to some embodiments of the present disclosure.

FIG. 12 shows a perspective view of an example cover for a delivery container, e.g., any of the delivery containers described above. The delivery container has large openings at either side, which provide good visibility into the container. However, particularly for temperature-sensitive loads and/or extreme weather conditions (e.g., high heat and sun), the open delivery container may not provide sufficient climate control. In some embodiments, the delivery container may include a cover, such as the cover 1210 shown in FIG. 12, over one or both of the openings. The cover 1210 is attached at a hinge joint 1220 to a top edge of the delivery container. The cover 1210 may be opened and closed manually and/or by an actuator. The cover 1210 may be made of a clear plastic or other clear material, so that a user can see into the delivery container. Alternatively, the cover 1210 may be made of an opaque plastic, metal, Styrofoam, or other opaque material that may provide better insulation and shield the items from the sun. The cover 1210, and the rest of the delivery container, may be insulated to help maintain items in the delivery container at their initial temperature. In some embodiments, the delivery container further includes active heating and/or cooling to maintain a temperature within the delivery container. For example, if the delivery container is used in AV that does not have a human in the passenger compartment, cooling only the delivery container may be more energy efficient than cooling the entire passenger cabin.

Whether or not the cover and/or delivery container are insulated, a cover such as the cover 1210 shown in FIG. 12 may also provide greater protection of the delivery items, e.g., preventing items from falling out or moving too much during transportation. In alternative embodiments, the delivery container may include cargo netting, straps, or other types of covers or restraint mechanisms across some or all of the open portion of the delivery container.

Example Delivery Container Lights

Figure 13:
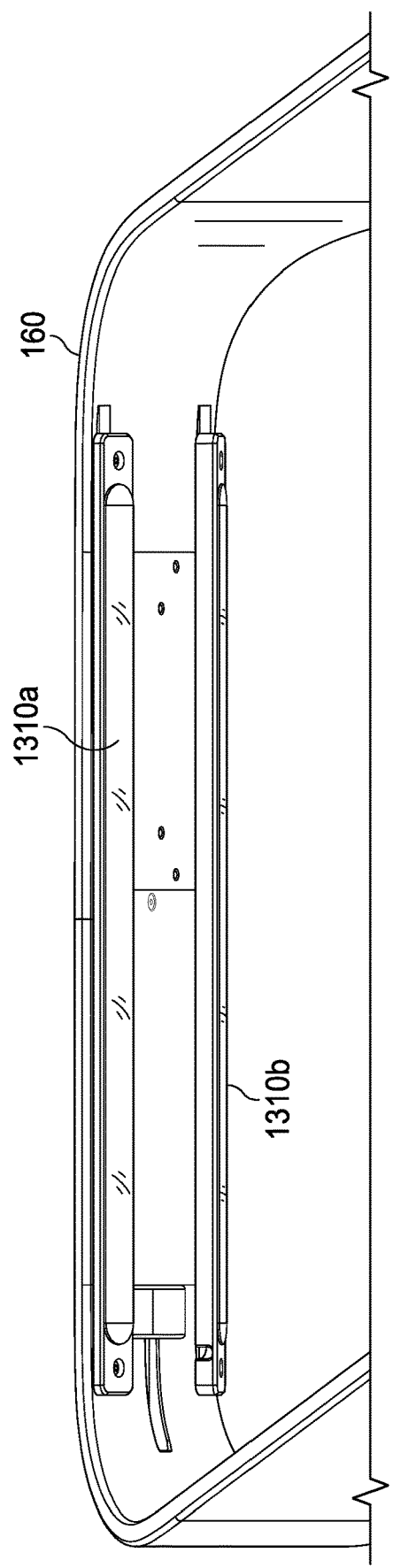
FIG. 13 shows a detail view of the top of the delivery container with two light strips, according to some embodiments of the present disclosure.

FIG. 13 shows a detail view of the top of the delivery container with two light strips, according to some embodiments of the present disclosure. In some embodiments, the top 160 of the delivery container includes integrated lighting to illuminate the interior of the delivery container. The lighting can increase visibility into the container, especially during night-time, in parking garages, or in other low-light environments. In this example, the top 160 of the delivery container includes two light strips 1310a and 1310b, e.g., two LED light strips. In some cases, lighting of different portions of the delivery container (e.g., two compartments divided by a divider) may be separately controlled. For example, the first light strip 1310a is directed into a first compartment of the delivery container, and the second light strip 1310b is directed into a second compartment of the delivery container. If a divider is included (e.g., as shown in FIGS. 9-11), the first light strip 1310a may be positioned on one side of the divider, and the second light strip 1310b positioned on the other side of the divider. If a recipient is receiving items located across the full container, the full set of lights may turn on, whereas if a recipient is receiving items located in one compartment, the light or lights directly over that compartment may turn on, while the other light or lights are not turned on.

SELECT EXAMPLES

Example 1 provides an in-vehicle delivery container configured to fit into a rear cabin of a vehicle, the in-vehicle delivery container including a base having a first edge, a second edge opposite the first edge, a third edge extending between the first edge and the second edge, and a fourth edge opposite the third edge and extending between the first edge and the second edge, the third edge proximate to a first door to the rear cabin, the fourth edge proximate to a second door to the rear cabin; a first side extending upward from the first edge, the first side having a first width at a lower portion of the first side and a second width at an upper portion of the first side, the second width less than the first width, the first side proximate to a back of the rear cabin; a second side extending upward from the second edge; and a top extending between the first side and the second side, the top having a smaller surface area than the base.

Example 2 provides the delivery container of example 1, where an angle between the base of the delivery container and the first side of the delivery container is greater than 90°.

Example 3 provides the delivery container of example 1, where the base has a plurality of attachment points for attaching to a structural frame, the structural frame configured to securely mount to the rear cabin of the vehicle.

Example 4 provides the delivery container of example 1, further includes a first lip extending upward from the third edge and a second lip extending upward from the fourth edge.

Example 5 provides the delivery container of example 1, further including a divider separating a first compartment of the delivery container from a second compartment of the delivery container, the first compartment accessible from the first door to the rear cabin, and the second compartment accessible from the second door of the rear cabin.

Example 6 provides the delivery container of example 5, further including a moveable drawer to hold items in the second compartment, where the drawer can move items from the second compartment to the first compartment so the items can be accessed from the first door.

Example 7 provides a delivery container including a base having a first edge, a second edge opposite the first edge, a third edge extending between the first edge and the second edge, and a fourth edge opposite the third edge and extending between the first edge and the second edge, the first edge and second edge having greater length than the third edge and the fourth edge; a first side extending upward from the first edge, the first side having a first width at a lower portion of the first side and a second width at an upper portion of the first side, the second width less than the first width; a second side extending upward from the second edge; and a top extending between the first side and the second side, the top opposite the base.

Example 8 provides the delivery container of example 7, further includes a first lip extending upward from the third edge and a second lip extending upward from the fourth edge.

Example 9 provides the delivery container of example 8, where at least a portion of the first lip and at least a portion of the second lip curve outward from the third edge and the fourth edge, respectively.

Example 10 provides the delivery container of example 7, further including a first rounded joint region between the first edge and the first side and a second rounded joint region between the second edge and the second side.

Example 11 provides the delivery container of example 7, further including a divider separating a first compartment of the delivery container from a second compartment of the delivery container, the first compartment including the third edge and the second compartment including the fourth edge.

Example 12 provides the delivery container of example 11, where the divider is a curtain extending downward from the top of the delivery container.

Example 13 provides the delivery container of example 11, where the divider is a spring-loaded divider configurable in a first position and a second position, where the divider in the first position separates the first compartment of the delivery container from the second compartment of the delivery container.

Example 14 provides the delivery container of example 13, further including a latch to secure the spring-loaded divider in the first position, where actuating the latch releases the spring-loaded divider from the first position.

Example 15 provides the delivery container of example 7, where the base includes a plurality of attachment points for attaching to a structural frame, the structural frame configured to be securely mounted in a rear cabin of a vehicle.

Example 16 provides the delivery container of example 7, further including a light coupled to an underside of the top, the light to illuminate contents of the delivery container.

Example 17 provides the delivery container of example 7, further including a drip tray over the base, the drip tray including ridges separated by grooves.

Example 18 provides a delivery container including a base having a first surface area, the base having a first edge, a second edge opposite the first edge, a third edge extending from the first edge and the second edge, and a fourth edge opposite the third edge and extending between the first edge and the second edge; a first side extending upward from the first edge; a second side extending upward from the second edge; and a top extending between the first side and the second side, the top having a smaller surface area than the base.

Example 19 provides the delivery container of example 18, where an angle between the base of the delivery container and the first side of the delivery container is greater than 90°, and an angle between the base of the delivery container and the second side of the delivery container is less than 90°.

Example 20 provides the delivery container of example 18, where the first side has a first width at its base and a second width at its top, the second width less than the first width; and the second side has the first width at its base and the second width at its top.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It is imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An in-vehicle delivery container configured to fit into a rear cabin of a vehicle, the in-vehicle delivery container comprising:
    a base comprising a first edge, a second edge opposite the first edge, a third edge extending between the first edge and the second edge, and a fourth edge opposite the third edge and extending between the first edge and the second edge, the third edge proximate to a first door to the rear cabin, the fourth edge proximate to a second door to the rear cabin;
    a first side extending upward from the first edge, the first side having a first width at a lower portion of the first side and a second width at an upper portion of the first side, the second width less than the first width, the first side proximate to a back of the rear cabin;
    a second side extending upward from the second edge;
    a top extending between the first side and the second side, the top having a smaller surface area than the base;
    a divider attached to the top, the divider separating a first compartment of the delivery container from a second compartment of the delivery container, the first compartment accessible from the first door to the rear cabin, and the second compartment accessible from the second door of the rear cabin; and
    a drawer to hold items in the second compartment, the drawer configured to move from the second compartment to the first compartment, wherein the divider is moveable to enable passage of the drawer from the second compartment to the first compartment.

2. The delivery container of claim 1, wherein an angle between the base of the delivery container and the first side of the delivery container is greater than 90°.

3. The delivery container of claim 2, wherein the divider has a divider top extending along the top of the delivery container and a divider side extending downward from the divider top, and an angle between the divider top and the divider side is 90°.

4. The delivery container of claim 1, wherein the base comprises a plurality of attachment points for attaching to a structural frame, the structural frame configured to securely mount to the rear cabin of the vehicle.

5. The delivery container of claim 1, further comprising a first lip extending upward from the third edge and a second lip extending upward from the fourth edge.

6. The delivery container of claim 1, wherein the divider is attached to the top of the delivery container along at least one rail, and moving the divider along the at least one rail changes a size of the first compartment and changes a size of the second compartment.

7. The delivery container of claim 1, wherein moving the drawer from the second compartment to the first compartment causes the divider to move to allow passage of the drawer.

8. A delivery container comprising:
a base comprising a first edge, a second edge opposite the first edge, a third edge extending between the first edge and the second edge, and a fourth edge opposite the third edge and extending between the first edge and the second edge, the first edge and second edge having greater length than the third edge and the fourth edge;
a first side extending upward from the first edge, the first side having a first width at a lower portion of the first side and a second width at an upper portion of the first side, the second width less than the first width;
a second side extending upward from the second edge;
a top extending between the first side and the second side, the top opposite the base;
a divider attached to and extending downward from the top, the divider separating a first compartment of the delivery container from a second compartment of the delivery container, the first compartment comprising the third edge and the second compartment comprising the fourth edge; and
a drawer to hold items in the second compartment, the drawer configured to move from the second compartment to the first compartment, wherein the divider is moveable to enable passage of the drawer from the second compartment to the first compartment.

9. The delivery container of claim 8, further comprising a first lip extending upward from the third edge and a second lip extending upward from the fourth edge.

10. The delivery container of claim 9, wherein at least a portion of the first lip and at least a portion of the second lip curve outward from the third edge and the fourth edge, respectively.

11. The delivery container of claim 8, further comprising a first rounded joint region between the first edge and the first side and a second rounded joint region between the second edge and the second side.

12. The delivery container of claim 8, wherein the divider comprises a curtain extending downward from the top of the delivery container.

13. The delivery container of claim 8, wherein the divider is a spring-loaded divider configurable in a first position and a second position, wherein the divider in the first position separates the first compartment of the delivery container from the second compartment of the delivery container.

14. The delivery container of claim 13, further comprising a latch to secure the spring-loaded divider in the first position, wherein actuating the latch releases the spring-loaded divider from the first position.

15. The delivery container of claim 8, wherein the base comprises a plurality of attachment points for attaching to a structural frame, the structural frame configured to be securely mounted in a rear cabin of a vehicle.

16. The delivery container of claim 8, further comprising a light coupled to an underside of the top, the light to illuminate contents of the delivery container.

17. The delivery container of claim 8, further comprising a drip tray over the base, the drip tray comprising ridges separated by grooves.

18. A delivery container comprising:
a base having a first surface area, the base having a first edge, a second edge opposite the first edge, a third edge extending from the first edge and the second edge, and a fourth edge opposite the third edge and extending between the first edge and the second edge;
a first side extending upward from the first edge;
a second side extending upward from the second edge;
a top extending between the first side and the second side, the top having a smaller surface area than the base;
a divider attached to and extending downward from the top, the divider separating a first compartment of the delivery container from a second compartment of the delivery container, the first compartment comprising the third edge and the second compartment comprising the fourth edge; and
a drawer to hold items in the second compartment, the drawer configured to move from the second compartment to the first compartment, wherein the divider is moveable to enable passage of the drawer from the second compartment to the first compartment.

19. The delivery container of claim 18, wherein an angle between the base of the delivery container and the first side of the delivery container is greater than 90°, and an angle between the base of the delivery container and the second side of the delivery container is less than 90°.

20. The delivery container of claim 18, wherein the first side has a first width at its base and a second width at its top, the second width less than the first width; and the second side has the first width at its base and the second width at its top.

* * * * *